(12) United States Patent
Stahl et al.

(10) Patent No.: US 8,896,501 B2
(45) Date of Patent: Nov. 25, 2014

(54) SECURITY ELEMENT FOR THE IDENTIFICATION OF A SECURITY DOCUMENT USING LIQUID CRYSTAL DISPLAY DRIVEN WITH PIEZOELECTRIC ENERGY SOURCE AND METHOD FOR PRODUCING IT

(75) Inventors: Rainer Stahl, Nuremberg (DE); Gerrit Hackl, Nuremberg (DE); Steffen Weiss, Nuremberg (DE); Klaus Ludwig, Erlangen (DE); Johannes Schad, Furth (DE)

(73) Assignee: Poly IC GmbH & Co. KG, Furth (DE)

( * ) Notice: Subject to any disclaimer, the term of this patent is extended or adjusted under 35 U.S.C. 154(b) by 914 days.

(21) Appl. No.: 12/680,754

(22) PCT Filed: Sep. 16, 2008

(86) PCT No.: PCT/EP2008/007721
§ 371 (c)(1),
(2), (4) Date: May 24, 2010

(87) PCT Pub. No.: WO2009/043482
PCT Pub. Date: Apr. 9, 2009

(65) Prior Publication Data
US 2010/0277441 A1 Nov. 4, 2010

(30) Foreign Application Priority Data
Oct. 6, 2007 (DE) .......................... 10 2007 048 102

(51) Int. Cl.
*G09G 3/18* (2006.01)
(Continued)

(52) U.S. Cl.
CPC ............ *B42D 15/0013* (2013.01); *B32B 37/12* (2013.01); *B42D 15/10* (2013.01);
(Continued)

(58) Field of Classification Search
USPC ........ 345/38, 50, 87–104; 283/57–59, 72, 81, 283/83, 87, 90–91, 94, 107–111, 114; 235/487–488, 491–492, 494; 428/1.3–1.6; 977/701, 952; 427/146–152; 349/58, 60
See application file for complete search history.

(56) References Cited

U.S. PATENT DOCUMENTS 5,566,982 A   10/1996  Lehureau et al.
5,613,022 A *  3/1997  Odhner et al. .................. 385/37
(Continued)

FOREIGN PATENT DOCUMENTS

JP   HEI 11-24062   1/1999
JP   2000-147536    5/2000
(Continued)

*Primary Examiner* — Joe H Cheng
*Assistant Examiner* — Keith Crawley
(74) *Attorney, Agent, or Firm* — William Squire; Elliot M. Olstein; Carella Byrne, et al.

(57) ABSTRACT

The invention relates to a security element for the identification of a security document, in particular a banknote, a valuable paper or a paper document, comprising at least one electrically controllable display element and at least one piezoelectric energy source which controls the at least one display element. The security element is formed by a flexible multilayered film body comprising the at least one electrically controllable display element containing a display layer having liquid crystals that can be oriented in an electric field, and comprising the at least one piezoelectric energy source which controls the at least one display element and has at least one layer composed of piezoelectric material, wherein the security element has a thickness of at most 70 μm in a direction perpendicular to the plane of the film body.

34 Claims, 7 Drawing Sheets

(51) Int. Cl.
  *B42D 15/00*     (2006.01)
  *G02F 1/1333*    (2006.01)
  *B32B 37/12*     (2006.01)
  *B42D 25/00*     (2014.01)
  *G02F 1/01*      (2006.01)
  *G02F 1/1334*    (2006.01)
  *B32B 38/06*     (2006.01)

(52) U.S. Cl.
  CPC ........... *G02F 1/0128* (2013.01); *G02F 1/1334* (2013.01); *B32B 38/06* (2013.01); *B32B 2309/105* (2013.01); *B32B 2310/0831* (2013.01); *B32B 2425/00* (2013.01); *B42D 2033/26* (2013.01); *G02F 1/133305* (2013.01)
  USPC .................................. 345/50; 283/57; 349/60

(56) References Cited

U.S. PATENT DOCUMENTS

| | | | |
|---|---|---|---|
| 6,616,190 B1 * | 9/2003 | Jotcham | 503/200 |
| 6,639,578 B1 | 10/2003 | Comiskey et al. | |
| 6,924,781 B1 | 8/2005 | Gelbman | |
| 7,393,452 B2 | 7/2008 | Tay et al. | |
| 7,397,595 B2 | 7/2008 | Kojima | |
| 7,709,865 B2 | 5/2010 | Clemens et al. | |
| 7,774,606 B2 | 8/2010 | Jung et al. | |
| 7,821,794 B2 | 10/2010 | Pennaz et al. | |
| 7,865,734 B2 | 1/2011 | Jung et al. | |
| 7,940,340 B2 | 5/2011 | Ludwig et al. | |
| 2002/0124950 A1 * | 9/2002 | Klima, Jr. | 156/256 |
| 2004/0196230 A1 * | 10/2004 | Nose et al. | 345/87 |
| 2005/0128543 A1 * | 6/2005 | Phillips et al. | 359/15 |
| 2006/0071819 A1 * | 4/2006 | Johnson et al. | 341/15 |
| 2006/0182898 A1 * | 8/2006 | Ben-Shalom et al. | 428/1.3 |
| 2007/0152928 A1 * | 7/2007 | Doane et al. | 345/87 |
| 2007/0206249 A1 * | 9/2007 | Phillips et al. | 359/2 |
| 2008/0035736 A1 | 2/2008 | Tompkin et al. | |

FOREIGN PATENT DOCUMENTS

| | | |
|---|---|---|
| TW | 200504712 | 2/1993 |
| WO | 2006029857 A2 | 3/2006 |

* cited by examiner

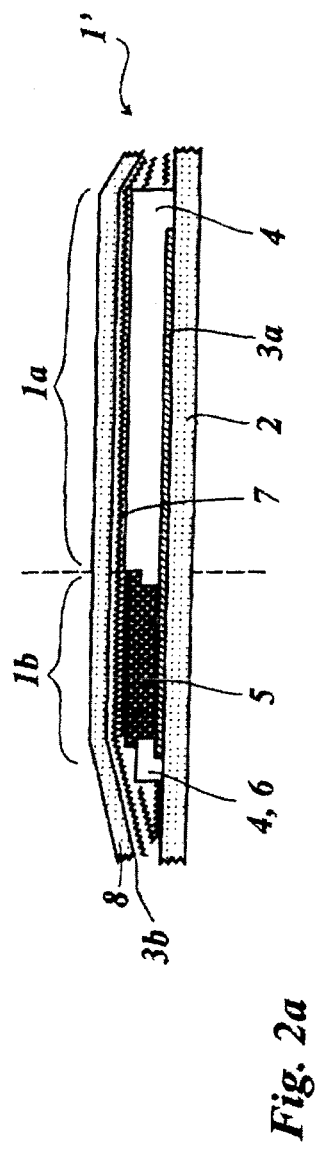
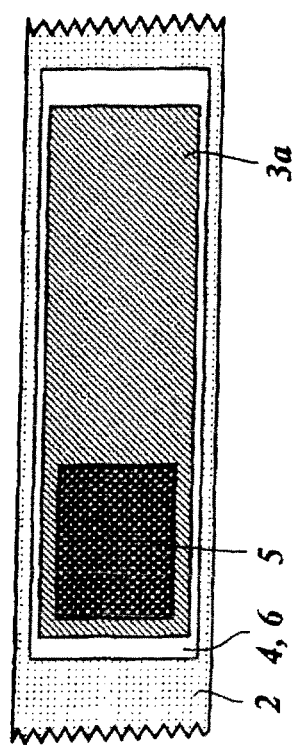
Fig. 2a
Fig. 2b

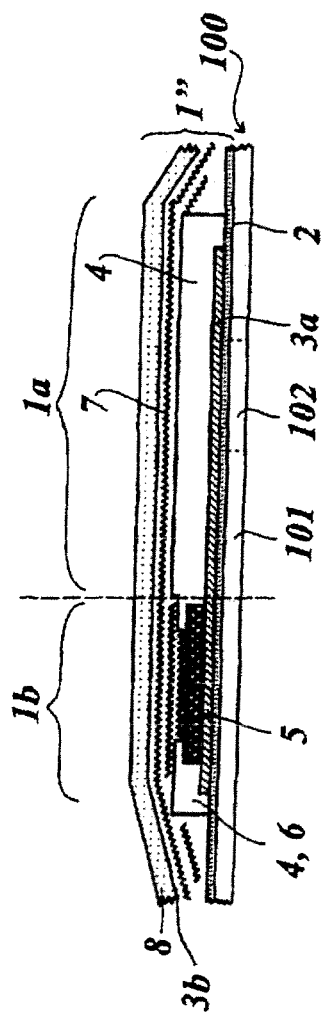
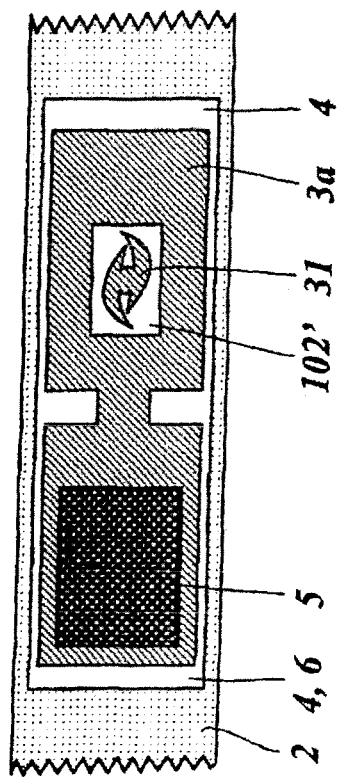

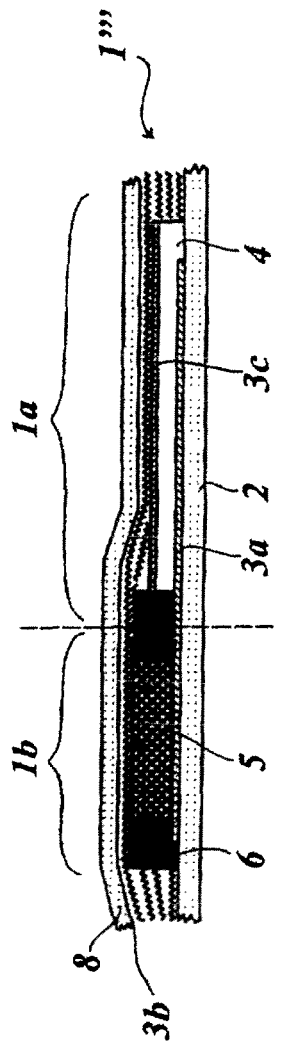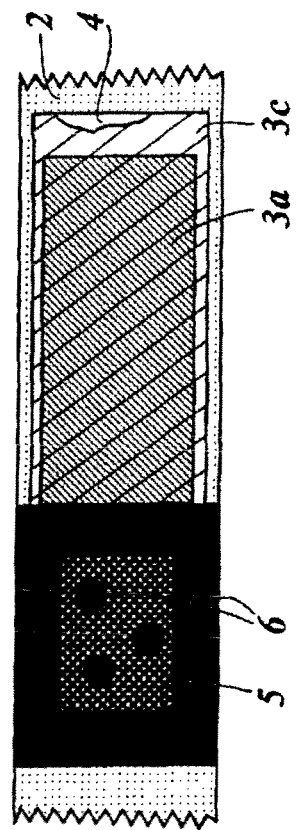
Fig. 4a
Fig. 4b

SECURITY ELEMENT FOR THE IDENTIFICATION OF A SECURITY DOCUMENT USING LIQUID CRYSTAL DISPLAY DRIVEN WITH PIEZOELECTRIC ENERGY SOURCE AND METHOD FOR PRODUCING IT

CROSS REFERENCE TO RELATED APPLICATIONS

Of interest is commonly owned copending application Ser. No. 12/677,372 entitled Multi-layer Flexible Film Layer filed Mar. 12, 2010 in the name of Klaus Ludwig et al.

The invention relates to a security element for the identification of a security document, in particular a banknote, a valuable paper or a paper document, comprising at least one electrically controllable display element and at least one piezoelectric energy source which controls the at least one display element, to a security document equipped with a security element of this type, to a method for producing such a security element, and also to a transfer film comprising a security element of this type.

A security document in the form of a mechanically pliable card comprising a security element of the type mentioned above is known from EP 634 732 B1. The pliable card is equipped, for validity checking purposes, with a security element or a checking device having two pliable electrodes and, between the latter, firstly a first structure comprising at least one layer composed of piezoelectric material which generates charges under the action of a mechanical stress, and secondly a second structure capable of switching between at least two optical states under the action of the charges. The card in accordance with EP 634 732 B1 has, in the region of the first structure, typically two films composed of a piezoelectric material having a thickness of 25 µm and, in the region of the second structure, a switchable layer having a thickness of 50 µm between two pliable substrates with a respective electrode. A coating is provided on one of the substrates, said coating forming an opening or a window which reveals the change in the optical state of the switchable layer or allows it to become visible when viewed in transmitted light.

A pliable card, such as a personal identity card, a credit card or the like, usually has a thickness in the range of 0.5 to 1 mm, such that the first and second structures can be integrated into it in a relatively simple manner.

Increasingly, however, security elements having electrically controllable display elements are also becoming of interest for the identification and safeguarding of significantly thinner security documents, such as, for example, banknotes, valuable papers or paper documents. These usually have a thickness in the range of less than 200 µm, in particular in the range of 50 µm to 200 µm, in particular in the range of 85 µm to 140 µm, wherein security elements connected thereto must not significantly impair the overall impression of the security document with regard to the pliability thereof and the properties thereof in everyday use.

It has been found, however, that it is not readily possible to transfer the security element known in the card field to significantly thinner security documents. Problems have thus been manifested in the context of producing a correspondingly thin security element that functions in a reproducible manner and at the same time also satisfies the mechanical requirements.

Therefore, it is an object of the invention to provide a security element comprising at least one electrically controllable display element and at least one piezoelectric energy source which controls the at least one display element for thin security documents having a thickness of less than 200 µm.

The object is achieved for the security element for the identification of a security document, in particular a banknote, a valuable paper or a paper document, which has at least one electrically controllable display element and at least one piezoelectric energy source which controls the at least one display element by virtue of the fact that the security element is formed by a flexible multilayered film body comprising the at least one electrically controllable display element containing a display layer having liquid crystals that can be oriented in an electric field, and furthermore comprising the at least one piezoelectric energy source which controls the at least one display element and has at least one layer composed of piezoelectric material, wherein the security element has a thickness of at most 70 µm in a direction perpendicular to the plane of the film body.

It has been found that security elements of this type having a thickness of at most 70 µm can be used for security documents having a thickness of less than 200 µm without the overall impression and the usability or durability of the security document being significantly impaired by the security element.

The security element is formed in such a way that it withstands without damage bending of the security document to which it is applied. In this case, the minimum bending radius for the security element is in the range of the thickness of the security document, but preferably in the range of ≥1 mm.

The layers required for producing the display element and the piezoelectric energy source can be formed with a particularly small layer thickness, in particular also with a layer thickness of less than approximately 24 µm, in the case of which the respective layers or the film element itself are no longer self-supporting.

In particular, it has proved to be worthwhile for a first embodiment of the security element if the film body has an optional first carrier film, a first electrode layer formed at least in regions, a layer composed of piezoelectric material and formed in regions on the first electrode layer, and also a display layer formed in regions and in the same plane on the first electrode layer, an optionally transparent adhesive layer formed at least in regions, a transparent second electrode layer formed at least in regions, and optionally a transparent protective layer.

It has proved to be worthwhile for a second embodiment of the security element if the film body has an optional first carrier film, a first electrode layer formed at least in regions, and also a second electrode layer formed at least in regions on the first carrier film in the same plane, a layer composed of piezoelectric material and formed in regions on the first and second electrode layers, and also a display layer formed in regions and in the same plane on the first and second electrode layers, optionally a transparent adhesive layer, and optionally a protective layer.

The thickness of the optional first carrier film is preferably in the range of 10 µm to 50 µm. What have proved to be suitable for forming the first carrier film are, in particular, materials such as PET, PEN, PE, PI, PP, PC, PTFE, paper, but also metal films, which simultaneously form the first electrode layer on account of the electrical conductivity. In this case, the first carrier film can also be formed in multilayered fashion and comprise, for example, individual layers composed of different materials. In particular, the first carrier film is constructed from two or three individual layers. Depending on the construction of the security element, the first carrier film can be used as a mechanical carrier for layers subsequently applied thereto, or else have no carrying function whatsoever and form an adhesive layer, for example.

At the same time, with the first carrier film, it is possible to set the stiffness of the thin security document in the region of the security element, whereby the functionality of the piezoelectric energy source is secured.

Furthermore, it has proved to be worthwhile for the security element if the first and the second embodiments are present in combined fashion.

In this case, by way of example, the display element can be present in the second embodiment, in which the electrode layers are arranged alongside one another in the same plane and below the display layer, while the energy source is present in the first embodiment, in which one electrode layer is arranged below the layer composed of piezoelectric material and the other electrode layer is arranged above the layer composed of piezoelectric material.

In this case, it has proved to be worthwhile if the film body has, in the region of the display element, a first electrode layer formed at least in regions, and also a second electrode layer formed at least in regions in the same plane, a display layer formed in regions on the first and second electrode layers, optionally a transparent adhesive layer and optionally a transparent protective layer, and in that the film body has, in the region of the energy source, a further second electrode layer formed at least in regions, thereon at least one layer composed of piezoelectric material, and also on the latter a further first electrode layer, wherein the first electrode layer and the second electrode layer of the display element are in each case electrically conductively connected to one of the further electrode layers of the energy source.

Conversely, the display element can be present in the first embodiment, in which one electrode layer is arranged below the display layer and the other electrode layer is arranged above the display layer, and the energy source can be present in the second embodiment, in which the electrode layers are arranged alongside one another in the same plane and below the layer composed of piezoelectric material.

In this case, it has proved to be worthwhile if the film body has, in the region of the display element, a first electrode layer formed at least in regions, a display layer formed in regions on the first electrode layer, optionally a transparent adhesive layer, a second electrode layer formed at least in regions, and optionally a transparent protective layer, and in that the film body has, in the region of the energy source, a first electrode layer formed in regions, and also a second electrode layer formed at least in regions in the same plane, thereon at least one layer composed of piezoelectric material, and also on the latter optionally a transparent adhesive layer, and optionally a transparent protective layer, wherein the first and the second electrode layers of the display element are in each case electrically conductively connected to one of the electrode layers of the energy source.

Preferably, the film body has at least one adhesion promoter layer adjoining the first and/or the second electrode layer(s).

The use of at least one adhesion promoter layer in the film element ensures a sufficient interlayer adhesion between the individual layers and the functionality of the security element over the entire service life of the security document.

Furthermore, it is advantageous if the film body has a supporting layer, which forms a frame around at least regions of the display layer as viewed perpendicularly to the plane of the film body. A supporting layer of this type contributes to a mechanical stabilization of the display element and, in the case of electrode layers not arranged on the same plane, to a standardization of the distance between the first and the second electrode layers in the region of the display layer, such that the electric field is as constant as possible over the region of the display layer and switches the display element homogeneously over its area.

Moreover, a sealing or optical delimitation of the display element and/or an optimization of the adhesion of the second electrode layer can be achieved by means of the supporting layer.

Both for the first embodiment and for the second embodiment and also for embodiments combined therefrom, the supporting layer is formed in electrically insulating fashion in order to avoid an electrical short circuit between the first and the second electrode layers, in particular also in the transition region between the display element and the energy source. In this case, the area extent of the display layer can be made smaller than, equal to, or larger than, that of the region enclosed by the frame.

Both in the first embodiment and in the second embodiment, the supporting layer preferably forms at least one web which overlaps the display layer. In this case, a web of this type can be connected to the frame or be arranged in a manner detached therefrom. In this case, a web is understood to mean, as viewed perpendicularly to the first carrier film, linear, punctiform or areal structures.

In this case, a linear web can form a straight line, an undulating line or a contour line, for example of a figurative representation, of a symbol, of a pattern region and the like. A punctiform web can have a contour that is circular, oval, angular, letter-shaped or shaped graphically in some other way. An areal web has a significantly larger area extent than a linear or punctiform web, with the result that even more complex contours can be realized here. The at least one web enables a further mechanical stabilization of the display element. In particular, it is preferred if a plurality of webs are present which preferably together form a grating-shaped structure within the frame furthermore formed by the supporting layer.

Preferably, the supporting layer is formed from a UV-cured lacquer, a thermally dried printing ink or from the same material as the layer composed of piezoelectric material. In principle, however, any layer is suitable which contributes to a mechanical stiffening and increase of the mechanical loading capacity of the display element and, in particular during a lamination process, can be compressed to a lesser extent than the display layer. Thus, in particular, electrically insulating screenprinting ink layers having a high pigment proportion or the like can be used.

It is particularly preferred if the supporting layer forms a visually recognizable design element. For this purpose, the supporting layer is colored, in particular, wherein a transparent colored supporting layer can be present at least in regions and/or an opaque colored supporting layer can be present at least in regions. For an observer of the security element, the supporting layer preferably forms a neat boundary for the display layer in order to cover or at least substantially hide untidy edges of the display layer that are present, if appropriate. Moreover, the supporting layer preferably has a graphically configured contour and exhibits, for example, a figurative representation, an image, a motif, a symbol, a logo, a portrait, a pattern, alphanumeric characters, a text and the like. The design element can thus arise from a colored or a colored and graphical configuration of the contour of the supporting layer.

The first electrode layer preferably has a layer thickness in the range of 1 nm to 500 nm. In this case, the first electrode layer can be formed such that it is opaque or at least locally transparent. Metals or metal alloys, such as aluminum, silver, gold, chromium, copper and the like, conductive non-metallically inorganic materials such as indium tin oxide (ITO) and the like, carbon nanotubes, and conductive polymers, such as PEDOT, PANI and the like, have proved to be worthwhile for forming the first electrode layer.

At least in the first embodiment, the second electrode layer is formed such that it is at least locally transparent, and preferably has a layer thickness in the range of 1 nm to 500 nm. Thin layers composed of metal or metal alloys, in particular composed of aluminum, silver, gold, chromium, copper and the like, composed of conductive non-metallically inorganic materials, in particular composed of indium tin oxide (ITO) and the like, composed of carbon nanotubes and composed of transparent conductive polymers, in particular composed of PEDOT, PANI, and the like, have proved to be worthwhile for forming an at least locally transparent second electrode layer.

The electrode layers are formed preferably by vapor deposition or sputtering, particularly when forming metallic or non-metallically inorganic electrode layers, or by conventional printing methods such as screen printing, relief printing, intaglio printing or blade coating, particularly when forming polymeric electrode layers.

However, the use of a transfer film for forming electrode layers by means of embossing is also possible.

When electrode layers are formed only in regions, in particular patterns, motifs, gratings or the like are formed by said electrode layers. Patterns or motifs of this type are preferably recognizable visually and without further aids.

The protective layer is preferably formed as a second carrier film, which is self-supporting, or as a protective lacquer layer, which is not self-supporting on account of its small layer thickness. The first and the second carrier films are preferably formed from the same material.

The protective layer is preferably formed such that it is transparent in colored fashion. The protective layer is formed, in particular, from PET, PEN, PE, PI, PP, PC or PTFE.

It has proved to be worthwhile if the film body is provided on a transfer film, such that the security element can be applied to a security document by means of embossing. Such a transfer film has at least one security element according to the invention, wherein the at least one security element is arranged on a carrier film of the transfer film and is releasable therefrom.

Proceeding from the carrier film of the transfer film, a release layer is usually present in this case in order to be able to release the film element from the carrier film of the transfer film after embossing. Preferably, the optional transparent protective layer formed as a protective lacquer layer and furthermore the remaining construction of the security element are present on a side of the release layer which is remote from the carrier film of the transfer film.

The film body can be fixed to the security document by means of an adhesive layer, in particular composed of a cold-bonding or hot melt adhesive. However, the adhesive layer may also already be formed by the first carrier film, which in this case need not function as a mechanical carrier.

It has proved to be worthwhile if the transparent adhesive layer internally in the security element has a layer thickness of at most 2 µm.

The transparent adhesive layer is formed from an electrically conductive material or from an electrically insulating material, the latter being preferred.

With the use of an electrically conductive adhesive layer for the first embodiment of the security element, an electrical contact is produced between the display layer and the second electrode layer and also the layer composed of piezoelectric material and the second electrode layer, while with the use of an adhesive layer composed of electrically insulating material, in particular in the case of an adhesive layer formed over the whole area, a capacitive coupling of the display layer and also of the layer composed of piezoelectric material is effected, in the case of which there is no electrical contact between the display layer and the second electrode layer and also the layer composed of piezoelectric material and the second electrode layer. The display element is nevertheless functional if the polarization that can be produced in the energy source is sufficiently high, such that a sufficiently large electric field is formed between the first and the second electrode layers, which brings about a change in the optical state of the display layer.

Preferably, the adhesive layer is formed from an adhesive that crosslinks under UV irradiation, a photochemically or thermally activatable adhesive, a cold-bonding adhesive or a pressure-sensitive adhesive (PSA).

After the layer composed of piezoelectric material has been formed, a polarization of said layer is carried out, which is effected in a roll-to-roll method, in particular. In this case, a self-supporting first carrier film is used in strip form and provided in a manner wound up on a roll. The first carrier film is drawn off from said roll and supplied successively to different process units in order to apply the individual layers to it.

After the layer composed of piezoelectric material has been formed, in the first embodiment, an additional electrically conductive transparent auxiliary layer is preferably applied to said layer in order to be able to carry out the polarization thereof better.

In the first embodiment, an electric field of at least 50 MV/m is preferably applied over the layer thickness of the display layer. For this purpose, the first electrode layer and the additionally electrically conductive auxiliary layer or the first electrode layer and the second electrode layer are electrically contact-connected and supplied with a voltage particularly in the range of 500 V to 20 kV.

In the second embodiment, a procedure analogous to that is adopted, wherein the voltage is applied between the first and second electrode layers arranged in one plane.

In this case, it has proved to be worthwhile if the layer composed of piezoelectric material, at least in the region of the energy source, is additionally provided with the electrically conductive auxiliary layer on its side remote from the first electrode layer, said auxiliary layer improving the contact-connection of the layer composed of piezoelectric material that is to be polarized, for carrying out the polarization process. The auxiliary layer is formed, in particular, from an electrically conductive polymer such as PEDOT or PANI, but transparent metallic layers, transparent dielectric layers, such as composed of ITO (Indium Tin Oxide), for example, or layers containing carbon nanotubes are also suitable. Preferably, the auxiliary layer is printed onto the layer composed of piezoelectric material. An electrical short circuit between the auxiliary layer and the electrode layer(s) on that side of the layer composed of piezoelectric material which is remote from the auxiliary layer should be avoided.

In the first embodiment, in particular, the layer composed of piezoelectric material, at least in the region of the piezoelectric energy source, is preferably of a larger area extent than those regions of the electrode layers which are assigned to the energy source, such that, in the region of the energy source, the layer composed of piezoelectric material projects beyond the electrode layers at three of four edges. An electrical short circuit between the first and second electrode layers is reliably avoided as a result. In the region of the fourth edge, the energy source adjoins the display element.

The layer composed of piezoelectric material preferably has a layer thickness of at most 30 µm, in particular of at most 5 µm. Such thin layers composed of piezoelectric material can be produced by printing, in particular, wherein the capability for generating an electrical voltage when a bending load is applied is surprisingly maintained if a suitable stiffness is present.

However, the energy source can be activated not only by bending but also thermally by means of a temperature gradient applied over the layer composed of piezoelectric material.

It has been recognized that applying a layer composed of piezoelectric material with such a small layer thickness to a security document does not lead to a functioning piezoelectric energy source if a suitable stiffness is not simultaneously provided in the region of the energy source. The voltage yield of the layer composed of piezoelectric material can be set by means of the stiffness of the composite assembly composed of security element and security document in the region of the energy source. In this case, it is necessary to coordinate the stiffness of the composite assembly composed of security element and security document in the region of the energy source to the effect that, on the one hand, the minimum required electrical voltage or electric field strength for the switching of the display element must be generated and, on the other hand, the properties of the thin security document must not be altered locally to such a great extent that the stiffness leads to an impairment in the handling or lifetime of the security document.

It has proved to be worthwhile if a polymer, in particular of the polyvinylidene fluoride PVDF type, is used as piezoelectric material. However, other piezoelectric materials such as polyamides, polyurethanes, fluoropolymers and, in particular copolymers derived therefrom can also be used.

Preferably, the display layer has a layer thickness of at most 20 µm, in particular of at most 5 µm. The display layer is formed, in particular, from at least one layer of PDLC (=Polymer Dispersed Liquid Crystal). However, the use of other materials which, under the influence of current or voltage, change optically, for example illuminate or generate a color transition, can also be used for forming the display layer, such as, for example, electrochromic materials, layer systems for forming light-emitting diodes or electrophoretic display elements.

It is particularly preferred if the display layer is transparent under the action of the electric field, which, in particular, is generated by the piezoelectric energy source by the bending thereof between the first and the second electrode layers. As a result, information arranged on that side of the display layer which is remote from the observer can be exposed and read through the transparent display layer. Such information is read, in particular, visually and without further aids.

It has proved to be worthwhile if the first and, if appropriate, second electrode layer(s) has (have) a diffractive relief structure which generates an optically variable effect. The diffractive relief structure is introduced, in particular embossed, preferably into a surface of the first carrier film which faces the first electrode layer. As an alternative or in combination with respect thereto, the relief structure can also be embossed into the layer composed of piezoelectric material, the second electrode layer preferably functioning as a reflection layer.

In this case, the first carrier film is formed from an embossable thermoplastic material or comprises, on its surface facing the first electrode layer, an embossable layer, in particular a replication lacquer layer composed of a UV-cured lacquer or a thermoplastic material, into which the diffractive relief structure is introduced, in particular embossed. The adjoining electrode layer(s) are made so thin on the diffractive relief structure that the relief structure is impressed on that side of the electrode layer(s) which is remote from the first carrier film. The optically variable effect is produced by diffraction of the incident light at the impressed relief structure, wherein, in particular, viewing angle-dependent color and/or motif changes, brightness changes, holograms, Kinegram®s and the like are formed. In this case, the electrode layer(s) which impresses/impress the relief structure is/are preferably formed as reflection layer(s) composed of metal and/or a transparent material having a high refractive index in order that the optically variable effects generated by the relief structure can clearly emerge.

Preferably, the relief structure is arranged in a first region of the first and, if appropriate, second electrode layer(s), said first region overlapping the layer composed of piezoelectric material, and/or is arranged in a second region of the first and, if appropriate, second electrode layer(s), said second region overlapping the display layer.

In this case, it has proved to be advantageous if the supporting layer is configured in such a way that a design element formed by it interacts with the optically variable effect produced by the diffractive relief structure, particularly if they convey an information content recognizable as mutually associated. Furthermore, it has proved to be worthwhile if information which becomes recognizable only when a display layer is switched to be transparent interacts with the design element and the optically variable effect and they convey an information content recognizable as mutually associated.

It is particularly preferred if the first carrier film and/or the first electrode layer and/or the second electrode layer are/is transparent. Furthermore, it is advantageous if the layer composed of piezoelectric material and/or the supporting layer are/is transparent.

It is particularly preferred if the security element is transparent overall, provided that the display layer has also been switched to the transparent optical state.

The object is achieved for the security document, in particular a banknote, a valuable paper or a paper document, comprising at least one security element according to the invention, wherein the security document has a thickness of at most 200 µm, in particular a thickness in the range of 50 to 200 µm, in this case preferably in the range 85 to 140 µm.

In this case, the at least one security element can be embodied in strip form or in the form of a label on the security document.

Furthermore, it is advantageous if the security document, after the at least one security element has been applied, is printed with at least one opaque printing ink and/or at least one opaque color lacquer, only regions of the security element being covered thereby.

In this case, the stiffness of the composite assembly composed of security document and security element in the region of the piezoelectric energy source should be set in such a way that the impressed force and the mechanical stress caused thereby are distributed over further regions of the energy source, in particular over the entire region of the energy source, in order to generate a sufficiently high voltage for the switching of the display element upon the bending of the layer composed of piezoelectric material. The stiffness can be influenced and brought to the required range generally before or after application of the security element to the security document by means of targeted regional application of opaque printing ink and/or of an opaque color lacquer and/or application of further, including whole-area transparent layers.

It is preferred if at least the electrically controllable display element of the at least one security element is arranged at least in regions in a transparent region of the security document. In this case, the security element can span a transparent region formed as a window opening or can be arranged in the region of a transparent film on the security document. As a result, the display element can be viewed on both sides, provided that transparent first and second electrode layers are chosen in the region of the display element.

In this case, the at least one security element can be arranged on the security document or be embedded into the latter. The at least one security element is applied to a surface of the security document preferably by embossing using a transfer film or laminating film. Introduction within the security document is preferably effected as early as during the production of the security document. Thus, in the case of a security document composed of paper, the at least one security element can be introduced into the paper as early as during the paper production.

The object is achieved for the method for producing the security element according to the invention by virtue of the fact that the layer composed of piezoelectric material and/or the display layer and/or the supporting layer and/or the adhesive layer are/is formed by printing.

The printing medium for forming such a printed layer is in this case provided in particular in the form of a paste, an ink, a lacquer or a solution. The printing of particularly low-viscosity printing media leads to running or to untidy layer edges of the layer formed particularly when the entire amount of printing medium required for achieving the required layer thickness of the respective dry layer is printed in a single printing process. Repeated printing of a low-viscosity printing medium containing identical solid material, wherein a printing medium of this type is printed again onto an at least substantially dry first layer, makes it possible to construct a homogeneous, functional layer with a desired layer thickness with neat contours. Running or untidy layer edges are thereby effectively avoided.

In particular, printing processes such as flat-bed screen printing, rotary screen printing, intaglio printing, relief printing or a blade coating method are suitable for this purpose. A printing method makes it possible, in a particularly economic manner, to form particularly thin layers for forming the security element or to form security elements having a thickness of at most 70 µm which can be used for the identification and safeguarding of security documents having a thickness of at most 200 µm.

The object is furthermore achieved for the method for producing the security element according to the invention in accordance with the first embodiment containing a protective layer by virtue of the fact that a first layer stack is formed by at least the first electrode layer, the layer composed of piezoelectric material, the optional auxiliary layer, the display layer and the optional supporting layer being formed on the first carrier film, in that a second layer stack is formed by at least the second electrode layer and the adhesive layer being formed on the protective layer, and in that the first and the second layer stacks are connected by the adhesive layer of the second layer stack being laminated onto a side of the first layer stack which is remote from the first carrier film.

The object is achieved for the method for producing the security element according to the invention in accordance with the second embodiment by virtue of the fact that a first layer stack is formed by at least the first and the second electrode layers, the layer composed of piezoelectric material, the display layer and the optional supporting layer being formed on the first carrier film, in that a second layer stack is formed by at least the adhesive layer being formed on the protective layer, and in that the first and the second layer stacks are connected by the adhesive layer of the second layer stack being laminated onto a side of the first layer stack which is remote from the first carrier film.

In this case, it has proved to be worthwhile if the first layer stack is formed by the first carrier film being transported from roll to roll and in the process at least the first electrode layer, the layer composed of piezoelectric material, the display layer and the optional supporting layer being formed successively on the first carrier film.

Preferably, the second layer stack is formed by the protective layer being transported from roll to roll and in the process, if appropriate, the second electrode layer and at least the adhesive layer being formed on the protective layer.

In the case where the film element is formed on a transfer film, a release layer is applied, in particular printed, onto a carrier film in a roll-to-roll method and the protective layer formed as a protective lacquer layer is applied, in particular printed, onto said release layer. The further layers of the film element are then formed successively on the protective lacquer layer.

Furthermore, it is advantageous if, moreover, at least one layer from the group comprising an adhesion promoter layer, the first electrode layer and the second electrode layer are formed by printing.

FIGS. 1 to 7b show, by way of example, different security elements according to the invention, a security document equipped therewith, and a transfer film for applying a security element by means of embossing. Thus:

FIG. 2a shows a second security element in cross section;

FIG. 2b shows the first layer stack of the second security element from FIG. 2a in plan view;

FIG. 3a shows a third security element on a security document in cross section;

FIG. 3b shows a first layer stack of the third security element from FIG. 3a in plan view;

FIG. 4a shows a fourth security element in cross section;

FIG. 4b shows the first layer stack of the fourth security element from FIG. 4a in plan view;

FIG. 5 shows a transfer film for forming the third security element in accordance with FIG. 3a in cross section;

FIG. 7b shows the sixth security element from FIG. 7a in plan view.

Figures 1A, 1B:
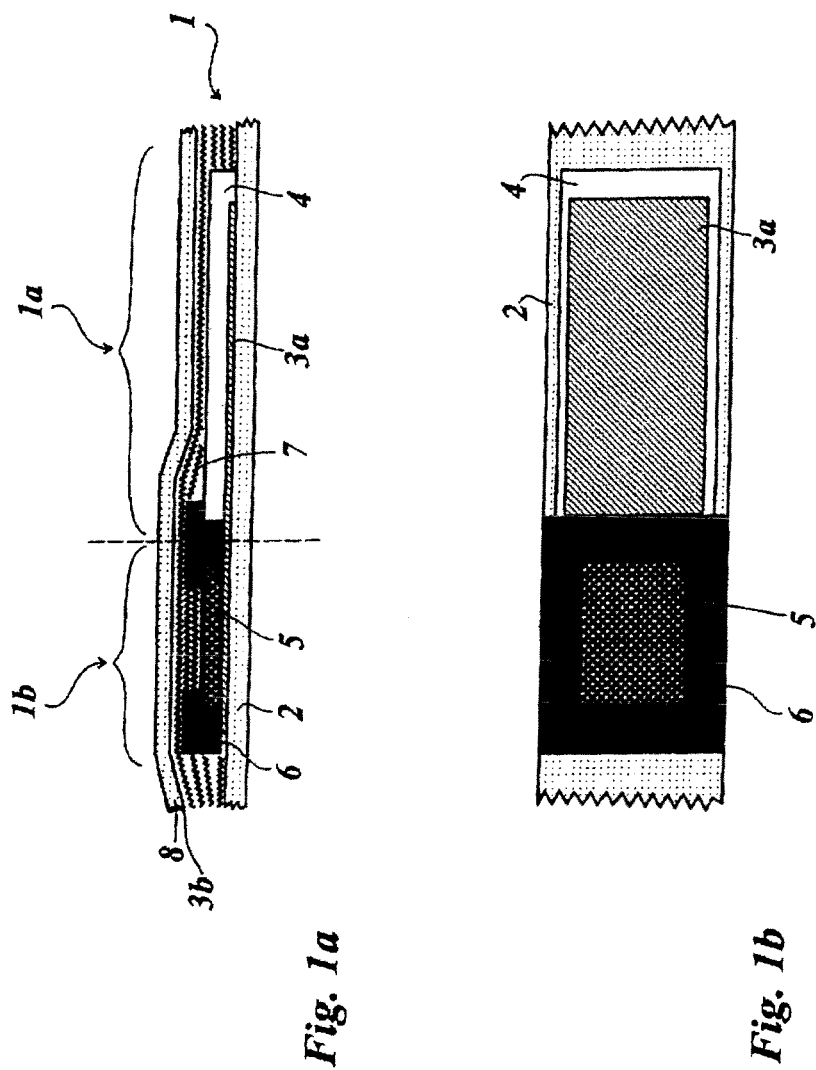
FIG. 1a shows a first security element in cross section.
FIG. 1b shows the first layer stack of the first security element from FIG. 1a in plan view.

FIG. 1a shows a first security element 1 comprising a piezoelectric energy source 1a and an electrically controllable display element 1b in cross section. An opaque metallic first electrode layer 3a is arranged in regions on a first carrier film 2 composed of PET. The first electrode layer 3a is formed on the first carrier film 2 by vapor deposition or sputtering. The transparent layer 4 composed of piezoelectric material, here PVDF, with a layer thickness of 15 µm is arranged in regions on the first electrode layer 3a, said transparent layer projecting beyond the first electrode layer 3a at three of four edges. The layer 4 composed of PVDF is formed by the printing of a solution containing PVDF and subsequent drying, which was furthermore polarized. The layer 4 composed of PVDF is preferably covered with an electrically conductive auxiliary layer (not illustrated separately here), which is printed, for example. For the polarization of the layer 4 composed of PVDF, a voltage is briefly applied between the auxiliary layer and the first electrode layer 3a, said voltage generating an electric field of at least 50 MV/m.

Furthermore, the display layer 5 composed of PDLC with a layer thickness of 10 µm is formed on the first electrode layer 3a. The display layer 5 is formed by the printing of a solution containing prepolymer(s) and liquid crystal material and subsequent drying. After the display layer 5 has been formed, an opaque colored supporting layer 6 composed of a UV-cured lacquer is applied, which forms a frame around the display layer 5. The first carrier film 2, the first electrode layer 3a, the layer 4 composed of PVDF, the display layer 5 and the supporting layer 6 form a first layer stack (for plan view see FIG. 1b). The first layer stack is preferably formed by the first carrier film 2 being transported from roll to roll, wherein the first carrier film 2 is drawn off from a first roll, provided with the layers and wound up on a second roll.

A transparent adhesive layer 7 composed of a UV adhesive having a layer thickness of 1 µm covers the layer 4 composed of PVDF or, if appropriate, the electrically conductive auxiliary layer, the display layer 5 and the supporting layer 6. A transparent second electrode layer 3b composed of PEDOT with a layer thickness of 0.1 µm and also a transparent protective layer 8 composed of PET are situated over the whole area on the adhesive layer 7. The protective layer 8 is embodied in the form of a self-supporting second carrier film and forms together with the second electrode layer 3b and the adhesive layer 7 a second layer stack, which is connected or adhesively bonded to the first layer stack. The second layer stack is formed, in particular, by the second carrier film being transported from roll to roll, wherein the second carrier film is drawn off from a first roll, provided with the layers 3b, 7 and wound up on a second roll. The first and second layer stacks are joined together by lamination. As an alternative, the second electrode layer can also be embossed onto the first layer stack by means of a transfer film, such that the self-supporting protective layer 8 is obviated. Instead, a thin, non-self-supporting protective lacquer layer can be provided, which is provided on the transfer film, in order to be embossed together with the second electrode layer onto the first layer stack.

If no electrically conductive auxiliary layer is arranged on the layer 4 composed of PVDF, then the polarization of the layer 4 composed of PVDF is effected by applying an electrical voltage between the first electrode layer 3a and the second electrode layer 3b.

FIG. 1b shows the first layer stack of the first security element 1 from FIG. 1a in plan view, wherein the first electrode layer 3a is visible through the transparent layer 4 composed of PVDF. The supporting layer 6 covers the edges of the display layer 5.

FIG. 2a shows a second security element 1' comprising a piezoelectric energy source 1a and an electrically controllable display element 1b in cross section. An opaque first electrode layer 3a composed of metal is arranged in regions on a first carrier film 2 composed of PET. The first electrode layer 3a is formed on the first carrier film 2 by vapor deposition or sputtering. The transparent layer 4 composed of piezoelectric material, here PVDF, with a layer thickness of 20 µm is arranged in regions on the first electrode layer 3a, said transparent layer projecting beyond the first electrode layer 3a at all four edges and leaving free a region for forming the display layer 5 on the first electrode layer 3a. The layer 4 composed of PVDF is formed by the printing of a solution containing PVDF and subsequent drying which was furthermore polarized in the manner indicated above.

Furthermore, the display layer 5 composed of PDLC with a layer thickness of 10 µm is formed on the first electrode layer 3a. The display layer 5 is formed by the printing of a solution containing prepolymer(s) and liquid crystal material and subsequent drying. The layer 4 composed of PVDF, in the region of the display element 1b, simultaneously forms the supporting layer 6, which forms a frame around the display layer 5. The first carrier film 2, the first electrode layer 3a, the layer 4 composed of PVDF and hence and the supporting layer 6 and the display layer 5 form a first layer stack (for the plan view see FIG. 2b). The first layer stack is preferably formed by the first carrier film 2 being transported from roll to roll, wherein the first carrier film 2 is drawn off from a first roll, provided with the layers and wound up on a second roll.

A transparent adhesive layer 7 composed of a UV adhesive having a layer thickness of 2 µm covers the layer 4 composed of PVDF and hence the supporting layer and the display layer 5. A transparent second electrode layer 3b composed of ITO with a layer thickness of 50 nm and also a transparent protective layer 8 composed of PET are situated over the whole area on the adhesive layer 7. The protective layer 8 is embodied in the form of a self-supporting second carrier film and forms together with the second electrode layer 3b and the adhesive layer 7 a second layer stack, which is connected or adhesively bonded to the first layer stack. The second layer stack is formed, in particular, by the second carrier film being transported from roll to roll, wherein the second carrier film is drawn off from a first roll, provided with the layers and wound up on a second roll. The first and second layer stacks are joined together by lamination.

FIG. 2b shows the first layer stack of the second security element 1' from FIG. 2a in plan view, wherein the first electrode layer 3a is visible through the transparent layer 4 composed of PVDF and hence the supporting layer 6.

FIG. 3a shows in cross section a third security element 1" on a security document 100, which has a substrate 101 composed of paper with a transparent region 102. The third security element 1" has a piezoelectric energy source 1a and an electrically controllable display element 1b. A semitransparent first electrode layer 3a composed of metal is arranged in regions on a first carrier film 2 composed of PET, which is adhesively bonded onto the substrate 101, for example. The first electrode layer 3a is formed on the first carrier film 2 by vapor deposition or sputtering. The transparent layer 4 composed of piezoelectric material, here PVDF, with a layer thickness of 20 µm is arranged in regions on the first electrode layer 3a, said transparent layer projecting beyond the first electrode layer 3a at all four edges and leaving free a region for forming the display layer 5 on the first electrode layer 3a. The layer 4 composed of PVDF is formed by the printing of a solution containing PVDF and subsequent drying, which was furthermore polarized in the manner described above.

Furthermore, the display layer 5 composed of PDLC with a layer thickness of 10 µm is formed on the first electrode layer 3a. The display layer 5 is formed by the printing of a solution containing prepolymer(s) and liquid crystal material and subsequent drying. The layer 4 composed of PVDF, in the region of the display element 1b, simultaneously forms the supporting layer 6, which forms a frame around the display layer 5. The first carrier film 2, the first electrode layer 3a, the layer 4 composed of PVDF and hence the supporting layer 6 and the display layer 5 form a first layer stack (for the plan view see FIG. 3b). The first layer stack is preferably formed by the first carrier film 2 being transported from roll to roll, wherein the first carrier film 2 is drawn off from a first roll, provided with the layers and wound up on a second roll.

A transparent adhesive layer 7 composed of a UV adhesive having a layer thickness of 1 μm covers the layer 4 composed of PVDF and hence the supporting layer and the display layer 5. A transparent second electrode layer 3b composed of PEDOT with a layer thickness of 0.1 μm and also a transparent protective layer 8 composed of PET, which is embodied as a non-self-supporting protective lacquer layer, are situated over the whole area on the adhesive layer 7. The protective layer 8 forms together with the second electrode 3b and the adhesive layer 7 a second layer stack, which is connected or adhesively bonded to the first layer stack.

The second layer stack is formed, in particular, by a carrier film 201 of a transfer film 200 (see FIG. 5) with a release layer 202 applied thereon being transported from roll to roll, wherein the carrier film 201 is drawn off from a first roll, provided with the protective lacquer layer and the further layers and wound up on a second roll. The first and second layer stacks are joined together by lamination. A transfer film 200 containing the film element for forming the security element 1" is then present. In an embossing process, under the influence of temperature, the transfer film 200 is pressed against the security document 100 and fixed to the substrate 101 in regions, preferably by means of an adhesive layer that can be arranged on the substrate 101 or the first carrier film 2. Finally, the carrier film 201 of the transfer film 200 is stripped away, the security element 1" remaining on the substrate 101.

FIG. 3b shows the first layer stack of the third security element 1" from FIG. 3a in plan view, wherein the first electrode layer 3a is visible through the transparent layer 4 composed of PVDF and hence the supporting layer 6. The first electrode layer 3a has an opening 102', which is arranged congruently with respect to the transparent region 102 after the security element 1" has been fixed to the substrate 101. A pattern-shaped region 31 of the first electrode layer 3a is still present within the opening 102'. Said region is provided with a diffractive relief structure (not illustrated here), such that the pattern-shaped region 31 exhibits an optically variable effect.

FIG. 4a shows a fourth security element 1 comprising a piezoelectric energy source 1a and an electrically controllable display element 1b in cross section. An opaque metallic first electrode layer 3a is arranged in regions on a first carrier film 2 composed of PET. The first electrode layer 3a is formed on the first carrier film 2 by vapor deposition or sputtering. The transparent layer 4 composed of piezoelectric material, here PVDF, with a layer thickness of 20 μm is arranged in regions on the first electrode layer 3a, said transparent layer projecting beyond the first electrode layer 3a at three of four edges. The layer 4 composed of PVDF is formed by the printing of a solution containing PVDF and subsequent drying, which was furthermore polarized in the manner described above. An electrically conductive auxiliary layer 3c composed of PEDOT is applied to the layer 4 composed of PVDF, said auxiliary layer improving the electrical contact-connection of the layer 4 composed of PVDF during the polarization process.

Furthermore, an opaque colored supporting layer 6 composed of a UV-cured lacquer is applied on the first electrode layer 3a, said supporting layer forming a frame and three punctiform webs for the display layer 5 subsequently formed on the first electrode layer 3a. The display layer 5 composed of PDLC is formed with a layer thickness of 10 μm and by the printing of a solution containing prepolymer(s) and liquid crystal material and also subsequent drying. The first carrier film 2, the first electrode layer 3a, the layer 4 composed of PVDF, the auxiliary layer 3c, the display layer 5 and the supporting layer 6 form a first layer stack (for the plan view see FIG. 4b). The first layer stack is preferably formed by the first carrier film 2 being transported from roll to roll, wherein the first carrier film 2 is drawn off from a first roll, provided with the layers and wound up on a second roll.

A transparent adhesive layer 7 composed of a hot melt adhesive having a layer thickness of 2 μm covers the whole area of the layer 4 composed of PVDF, the display layer 5 and the supporting layer 6. A transparent second electrode layer 3b composed of ITO with a layer thickness of 50 nm and also a transparent protective layer 8 composed of PET are situated over the whole area on the adhesive layer 7. The protective layer 8 is embodied in the form of a self-supporting second carrier film and forms together with the second electrode layer 3b and the adhesive layer 7 a second layer stack, which is connected or adhesively bonded to the first layer stack. The second layer stack is formed, in particular, by the second carrier film being transported from roll to roll, wherein the second carrier film is drawn off from a first roll, provided with the layers and wound up on a second roll. The first and second layer stacks are joined together by lamination.

FIG. 4b shows the first layer stack of the fourth security element 1''' from FIG. 4a in plan view, wherein the first electrode layer 3a is visible through the transparent auxiliary layer 3c and the transparent layer 4 composed of PVDF. The supporting layer 6 optically masks the edges of the display layer 5.

Figure 5:
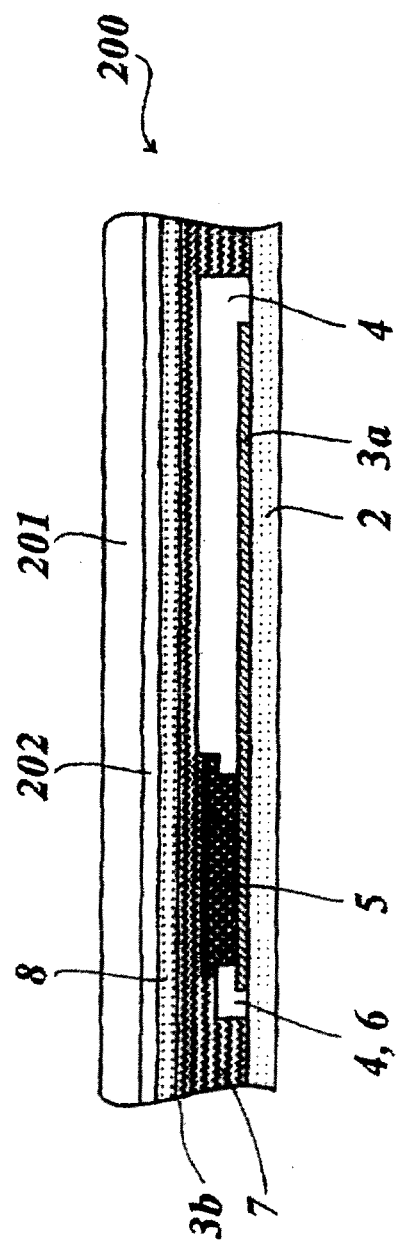

FIG. 5 shows in cross section a portion of a transfer film 200 for forming the third security element 1" in accordance with FIG. 3a, which has a non-self-supporting protective lacquer layer as the protective layer 8. A waxy release layer 202 is applied over the whole area on a carrier film 201 of the transfer film 200, to which release layer the protective layer 8 embodied as a protective lacquer layer is applied over the whole area. Furthermore, an adhesive layer (not illustrated here) can be arranged on that side of the transfer film 200 which is remote from the carrier film 201, in order to fix the security element 1" on the security document 100 (see FIG. 3a) and to be able to release the carrier film 200 therefrom. As an alternative, the first carrier film 2 can be present here without a carrying function and can be embodied as a non-self-supporting adhesive layer since the carrier function is provided by the carrier film 201.

Figure 6A:
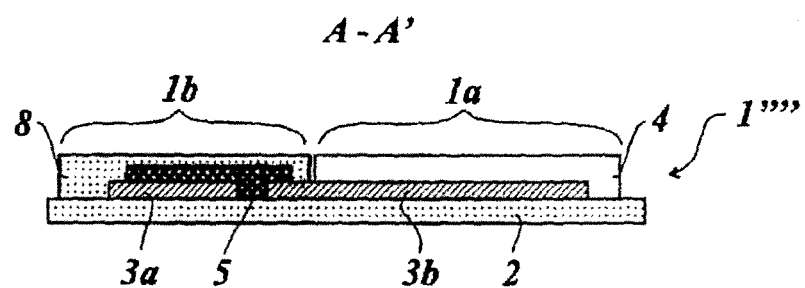
FIG. 6a shows a fifth security element in cross section A-A'.

FIG. 6a shows a fifth security element 1"" in cross section A-A' in accordance with the second embodiment comprising a piezoelectric energy source 1a and an electrically controllable display element 1b. An opaque first electrode layer 3a and also an opaque second electrode layer 3b, each composed of metal, are arranged in regions on a first carrier film 2 composed of PET. The first and the second electrode layers 3a, 3b are formed alongside one another in one plane on the first carrier film 2 and in a manner electrically insulated from one another, by means of vapor deposition or sputtering. A transparent layer 4 composed of piezoelectric material, here PVDF, with a layer thickness of 15 μm is arranged on the first and the second electrode layers 3a, 3b, in the region of the energy source 1a. The layer 4 composed of PVDF is formed by the printing of a solution containing PVDF and subsequent drying, which was furthermore polarized by application of a voltage between the first and the second electrode layers 3a, 3b.

Furthermore, the display layer 5 composed of PDLC with a layer thickness of 10 μm is formed on the first and the second electrode layers 3a, 3b in the region of the display element 1b. The display layer 5 is formed by the printing of a solution containing prepolymer(s) and liquid crystal material and subsequent drying. After the display layer 5 has been formed, an opaque colored supporting layer (not illustrated here) composed of a UV-cured lacquer can be applied, which forms a frame around the display layer 5. A transparent protective layer 8 composed of PET here covers only the display layer 5, but could furthermore also cover the layer 4 composed of piezoelectric material.

Figure 6B:
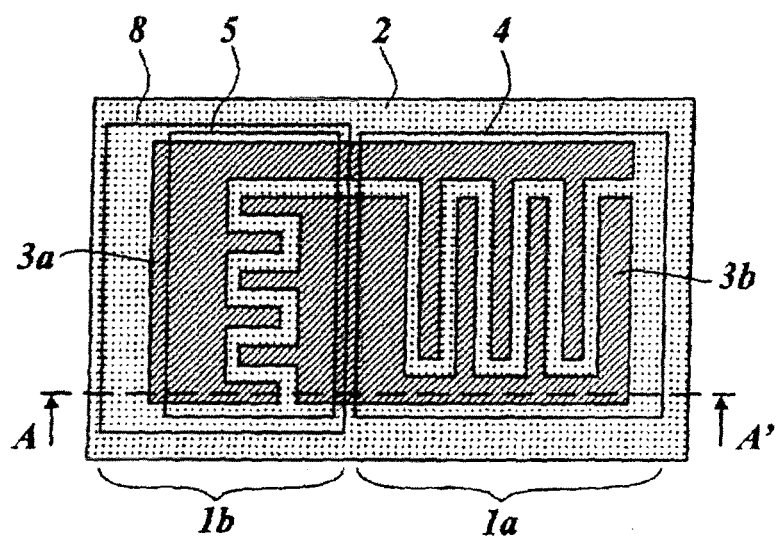
FIG. 6b shows the fifth security element from FIG. 6a in plan view.

FIG. 6b shows the fifth security element 1'''' from FIG. 6a in plan view, wherein the first and the second electrode layers 3a, 3b are visible through the transparent layer 4 composed of PVDF in the region of the energy source 1a and also through the display layer and the protective layer 8 in the region of the display element 1b.

Figure 7A:
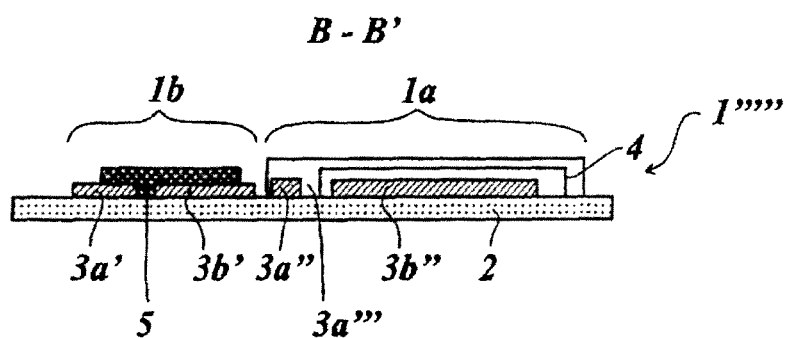
FIG. 7a shows a sixth security element in cross section B-B'.

FIG. 7a shows a sixth security element 1''''' in cross section B-B' in accordance with a combination of the first and the second embodiments. A piezoelectric energy source 1a is formed in accordance with the first embodiment, in which one electrode layer is arranged below the layer composed of piezoelectric material and one electrode layer is arranged above the layer composed of piezoelectric material. The electrically controllable display element 1b is formed in accordance with the second embodiment, in which the two electrode layers are arranged alongside one another below the display layer in the same plane and in a manner electrically insulated from one another.

In accordance with FIG. 7a, in the region of the display element 1b, an opaque metallic first electrode layer 3a' and also an opaque metallic second electrode layer 3b' are arranged in regions on a first carrier film 2 composed of PET. The first and the second electrode layers 3a', 3b' are formed alongside one another in one plane on the first carrier film 2 and in a manner electrically insulated from one another, by means of vapor deposition or sputtering. Furthermore, the display layer 5 composed of PDLC with a layer thickness of 10 μm is formed on the first and the second electrode layers 3a', 3b' in the region of the display element 1b. The display layer 5 is foamed by the printing of a solution containing prepolymer(s) and liquid crystal material and subsequent drying. Before or after the formation of the display layer 5, an opaque colored supporting layer (not illustrated here) composed of a UV-cured lacquer can be applied, which forms a frame around the display layer 5.

In accordance with FIG. 7a, furthermore, in the region of the energy source 1a, a further second electrode layer 3b'' is arranged on the first carrier film 2, said electrode layer being covered in regions by a transparent layer 4 composed of piezoelectric material, in this case PVDF, with a layer thickness of 15 μm. The second electrode layer 3b' and the further second electrode layer 3b'' are electrically conductively connected to one another and embodied in one piece. A further first electrode layer 3a''' composed of PEDOT is formed on the layer 4 composed of PVDF by printing, and is electrically conductively connected to the first electrode layer 3a' by means of the region 3a'' thereof.

The layer 4 composed of PVDF is formed by the printing of a solution containing PVDF and subsequent drying, which is furthermore polarized by application of a voltage between the further first electrode layer 3a''' and the further second electrode layer 3b''.

A transparent protective layer, which has not been illustrated here for the sake of better clarity, can cover the display element 1b and/or the energy source 1a.

Figure 7B:
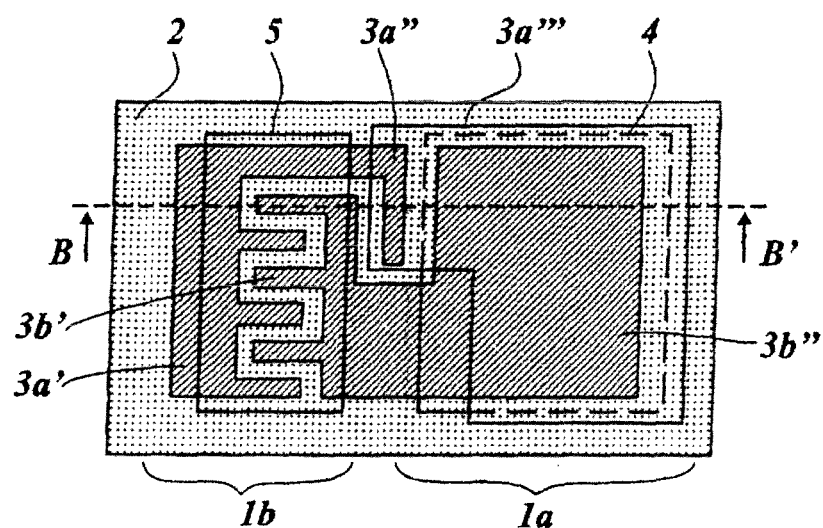

FIG. 7b shows the sixth security element 1''''' from FIG. 7a in plan view, wherein the first and the second electrode layers 3a', 3b' are visible through the display layer 5 and, if appropriate, the protective layer in the region of the display element 1b, and wherein, in the region of the energy source 1a, the further second electrode layer 3b'' is visible through the transparent layer 4 composed of PVDF and the further first electrode layer 3'''.

The illustrations in the figures merely show by way of example possible constructions of the security element according to the invention and, with knowledge of the invention, a multiplicity of further security elements are producible for the person skilled in the art, without having to take an inventive step or without departing from the concept of the invention.

The invention claimed is:

1. A security element for the identification of a security document comprising:
 a flexible multilayered film body defining a plane comprising:
 at least one electrically controllable display element; and
 at least one piezoelectric energy source which controls the at least one display element and having at least one layer of piezoelectric material;
 the at least one electrically controllable display element containing a display layer having liquid crystals that orient in response to an applied electric field;
 the multilayered body having a thickness of at most 70 μm in a direction perpendicular to the plane of the film body;
 wherein the film body includes a first carrier film and a first electrode layer, the at least one layer composed of piezoelectric material being on the first electrode layer, said display layer being coplanar with the piezoelectric material on the first electrode layer, the body including a transparent adhesive layer, a transparent second electrode layer, and a transparent protective layer formed by a second carrier film or a protective lacquer layer; and
 a supporting layer for the display layer forming a frame around the display element as viewed perpendicular to the plane of the film body;
 the supporting layer forming at least one web, which web overlaps the display layer, and which supporting layer, when viewed perpendicular to the first carrier film, forms a linear, punctiform, or areal structure, the supporting layer being arranged to contribute to the mechanical stabilization of the display element.

2. The security element as claimed in claim 1 wherein the first electrode layer defines a plane, and further including a second electrode layer coplanar with the first electrode layer, said at least one layer of piezoelectric material being on the first and second electrode layers, said display layer being on the first and second electrode layers.

3. The security element of claim 2 wherein the first carrier film is formed from an embossabie thermoplastic material or, having a surface facing the first electrode layer, comprises on the surface facing the first electrode layer, a replication lacquer layer composed of UV-cured lacquer or a thermoplastic material.

4. The security element as claimed in claim 1 wherein the film body includes, in the region of the display element, the first electrode layer and a second electrode layer coplanar with the first electrode layer, said display layer being on the first and second electrode layers, said film body including a transparent protective layer, the film body including in the region of the energy source a further second electrode layer, and thereon, the at least one layer composed of piezoelectric material, and on the latter a further first electrode layer, wherein the first electrode layer and the second electrode layer of the display element are each electrically conductively connected to one of the further first and second electrode layers.

5. The security element as claimed in claim 1 wherein the film body includes, in the region of the display element, the first electrode layer, said display layer being on the first electrode layer, the film body including a second electrode layer, the film body has, in the region of the energy source, coplanar further first and second electrode layers, and thereon the at least one layer of piezoelectric material, wherein the first and the second electrode layers of the display element are each electrically conductively connected to one of the further first and second electrode layers.

6. The security element as claimed in claim 1 wherein the film body includes a second electrode layer coplanar with the first electrode layer, the body further including at least one adhesion promoting layer adjoining one of the first and second electrode layers.

7. The security element as claimed in claim 1 wherein the supporting layer comprises one of a UV-cured lacquer, a thermally dried printing ink or the same material as the layer composed of piezoelectric material.

8. The security element as claimed in claim 1 wherein the supporting layer forms a visually recognizable design element.

9. The security element as claimed in claim 1 wherein, the at least one layer composed of piezoelectric material being on the first electrode layer, said display layer being coplanar with the piezoelectric material on the first electrode layer, the body including a transparent second electrode layer.

10. The security element as claimed in claim 1 wherein the layer composed of piezoelectric material has a layer thickness in the range of at most about 5 µm to 30 µm.

11. The security element as claimed in claim 1 wherein the piezoelectric material is a polyvinylidene fluoride PVDF polymer.

12. The security element as claimed in claim 1 wherein the display layer has a layer thickness in the range of at most about 5 µm to 20 µm.

13. The security element as claimed in claim 1 wherein the display layer is transparent in response to exposure to an electric field.

14. The security element as claimed in claim 1 wherein the display layer comprises at least one layer of PDLC.

15. The security element as claimed in claim 1 wherein the at least one layer composed of piezoelectric material being on the first electrode layer, said display layer being coplanar with the piezoelectric material on the first electrode layer, the body including a second electrode layer, at least one of the first and second electrode layer having a diffractive relief structure which generates an optically variable effect.

16. The security element as claimed in claim 15 wherein the relief structure is arranged in a first region of the one first and second electrode layers, said first region overlapping the layer composed of piezoelectric material, and/or is arranged in a second region of the at least one first and second electrode layers, said second region overlapping the display layer.

17. The security element as claimed in claim 1 wherein the at least one layer composed of piezoelectric material being on the first electrode layer, said display layer being coplanar with the piezoelectric material on the first electrode layer, the body including a transparent second electrode layer, at least one of the first carrier film, the first electrode layer or the second electrode layer being transparent.

18. The security element as claimed in claim 1 wherein at least one of the layer composed of piezoelectric material and the supporting layer is transparent.

19. The security element as claimed in claim 1 wherein at least one of the supporting layer and layer composed of piezoelectric material is transparent.

20. The security element of claim 1 wherein the adhesive layer is between the piezoelectric material and the second electrode layer.

21. The security element of claim 1 wherein the second electrode layer is arranged to function as a reflection layer.

22. A security document comprising a document portion with the security element as claimed in claim 1 attached to the document portion wherein the document portion has a thickness of at most about 200 µm.

23. The security document as claimed in claim 22 wherein the document portion has a transparent region, at least the electrically controllable display element of the at least one security element is located in the transparent region of the document portion.

24. The security document as claimed in claim 22 wherein the at least one security element is on or imbedded into the document portion.

25. A method for producing a security element as claimed in claim 1, comprising printing at least one of the layer composed of piezoelectric material, the display layer, a supporting layer for supporting the body and an adhesive layer attached to the body.

26. The method as claimed in claim 25 wherein the printing includes printing at least one layer from the group consisting of at least one of an adhesion promoting layer, the first electrode layer and the second electrode layer.

27. The method for producing the security element of claim 1 comprising forming a first layer stack with at least the first electrode layer, the layer composed of piezoelectric material, and the display layer, forming a second layer stack by at least a second electrode layer and the adhesive layer on the protective layer, and connecting the first and the second layer stacks with an adhesive layer of the second layer stack thereby forming a laminated structure, and attaching the second stack to a side of the first layer stack spaced from the first carrier film.

28. The method as claimed in claim 27 including forming the first layer stack by the first carrier film while the film is transported from roll to roll and forming at least the first electrode layer, the layer composed of piezoelectric material, the display layer and an optional supporting layer on the first carrier film.

29. The method as claimed in claim 27 including forming the second layer stack while transporting the protective layer from roll to roll and forming the second electrode layer and at least the adhesive layer on the protective layer.

30. The method for producing the security element as claimed in claim 2, comprising forming a first layer stack with at least the first and the second electrode layers; the layer composed of piezoelectric material and the display layer forming a second layer stack with at least an adhesive layer on the protective layer; and connecting the first and the second layer stacks with the adhesive layer of the second layer stack forming a lamination by attaching the second layer stack to a side of the first layer stack spaced from the first carrier film.

31. A transfer film comprising:
a carrier film; and
at least one security element as claimed in claim 1 wherein the at least one security element is on the carrier film and is releasable therefrom.

32. A security element for the identification of a security document comprising:
a flexible multilayered film body defining a plane comprising:
at least one electrically controllable display element; and at least one piezoelectric energy source which controls the at least one display element and having at least one layer of piezoelectric material;

the at least one electrically controllable display element containing a display layer having liquid crystals that orient in response to an applied electric field;

the multilayered body having a thickness of at most 70 μm in a direction perpendicular to the plane of the film body;

wherein the film body includes a first carrier film and a first electrode layer, the at least one layer composed of piezoelectric material being on the first electrode layer, said display layer being coplanar with the piezoelectric material on the first electrode layer, the body including a transparent adhesive layer, a transparent second electrode layer, and a transparent protective layer, at least one of the first and second electrode layers having a diffractive relief structure which generates an optically variable effect;

the relief structure being arranged in a first region of the one first and second electrode layers, said first region overlapping the layer composed of piezoelectric material, and/or is arranged in a second region of the at least one first and second electrode layers, said second region overlapping the display layer; and a supporting layer for the display layer forming a frame around the display element as viewed perpendicular to the plane of the film body;

the supporting layer forming at least one web, which web overlaps the display layer, and which supporting layer, when viewed perpendicular to the first carrier film, forms a linear, punctiform, or areal structure, the supporting layer being arranged to contribute to the mechanical stabilization of the display element.

33. A security element for the identification of a security document comprising:

a flexible multilayered film body defining a plane comprising:

at least one electrically controllable display element; and at least one piezoelectric energy source which controls the at least one display element and having at least one layer of piezoelectric material;

the at least one electrically controllable display element containing a display layer having liquid crystals that orient in response to an applied electric field;

the multilayered body having a thickness of at most 70 μm in a direction perpendicular to the plane of the film body;

wherein the film body includes a first carrier film and a first electrode layer, the at least one layer composed of piezoelectric material being on the first electrode layer, said display layer being in the same plane as the piezoelectric material on the first electrode layer, the body including a transparent adhesive layer, a transparent second electrode layer, and a transparent protective layer, at least one of the first and second electrode layers having a diffractive relief structure which generates an optically variable effect, the diffractive relief structure being introduced into a surface of the first carrier film and which surface faces the first electrode layer; and a supporting layer for the display layer forming a frame around the display element as viewed perpendicular to the plane of the film body;

the supporting layer forming at least one web, which web overlaps the display layer, and which supporting layer, when viewed perpendicular to the first carrier film, forms a linear, punctiform, or areal structure, the supporting layer being arranged to contribute to the mechanical stabilization of the display element.

34. The security element of claim 33 wherein the relief structure is embossed into the piezoelectric material.

* * * * *

UNITED STATES PATENT AND TRADEMARK OFFICE
CERTIFICATE OF CORRECTION

PATENT NO. : 8,896,501 B2
APPLICATION NO. : 12/680754
DATED : November 25, 2014
INVENTOR(S) : Rainer Stahl et al.

It is certified that error appears in the above-identified patent and that said Letters Patent is hereby corrected as shown below:

Title Page item (73), Assignee:
Change: Poly IC GmbH & Co. KG to PolyIC GmbH & Co. KG Title page
Add Assignee:
Leonhard Kurz Stiftung & Co. KG Furth, Germany Signed and Sealed this
Eighth Day of September, 2015

Michelle K. Lee
*Director of the United States Patent and Trademark Office*